United States Patent [19]
Crosnier Leconte et al.

[11] Patent Number: 5,400,524
[45] Date of Patent: Mar. 28, 1995

[54] INSTALLATION FOR CONTINUOUSLY DRYING, DEHYDRATING OR MICROWAVE BAKING OF GRANULAR OR POWDERED PRODUCTS

[75] Inventors: Dominique Crosnier Leconte, Aix en Provence; Frank Deramond, Clichy; Alain Germain, Bagneux, all of France

[73] Assignee: Microondes Energie Systemes S.A., France

[21] Appl. No.: 923,974
[22] PCT Filed: Mar. 18, 1991
[86] PCT No.: PCT/FR91/00216
§ 371 Date: Nov. 16, 1992
§ 102(e) Date: Nov. 16, 1992
[87] PCT Pub. No.: WO91/15095
PCT Pub. Date: Oct. 3, 1991

[30] Foreign Application Priority Data
Mar. 20, 1990 [FR] France .................. 90 03564

[51] Int. Cl.$^6$ ............................................ B23K 15/10
[52] U.S. Cl. ........................................ 34/259; 219/700; 219/695
[58] Field of Search .............. 34/1 P, 1 U, 1 V, 259, 34/263, 264, 265; 219/10.55 D, 10.55 F, 10.55 R, 10.55 A

[56] References Cited
U.S. PATENT DOCUMENTS
4,714,812 12/1987 Haagensen .................... 34/1 U FOREIGN PATENT DOCUMENTS
2-103394 4/1990 Japan ........................... 34/1 P Primary Examiner—Henry A. Bennett
Attorney, Agent, or Firm—Nawrocki, Rooney & Sivertson

[57] ABSTRACT

An installation for continuously treating a granular or powdered product. The installation includes at least one microwave applicator which is connected to a generator by a coupling device. The installation further includes a dielectric duct which has an axis and an internal surface. The dielectric duct passes through the applicator and contains a rotating metal screw for conveying the granular or powdered product therethrough. This is accomplished by constructing the screw so that it includes at least one helically wound wire which extends longitudinally through the duct at a radial distance from the axis of the duct and proximate the internal surface of the duct. An annular clearance is thereby defined between the wire and the internal surface of the duct.

19 Claims, 5 Drawing Sheets

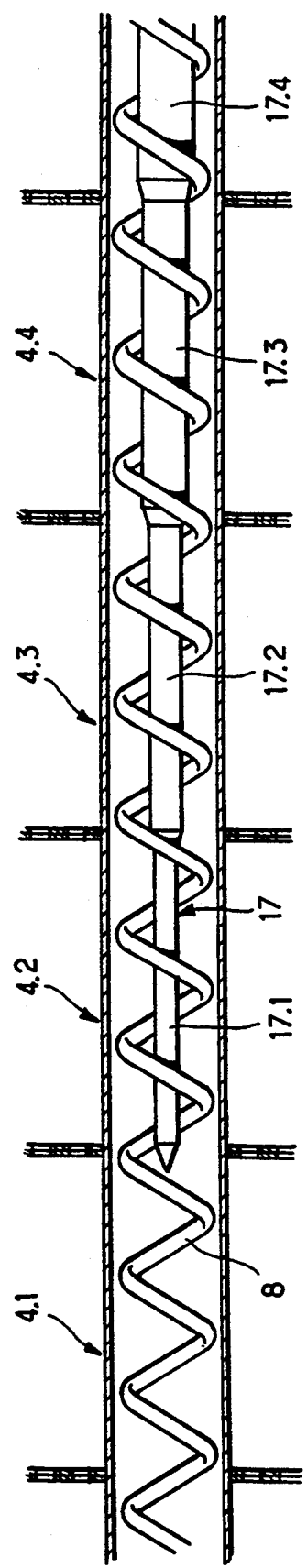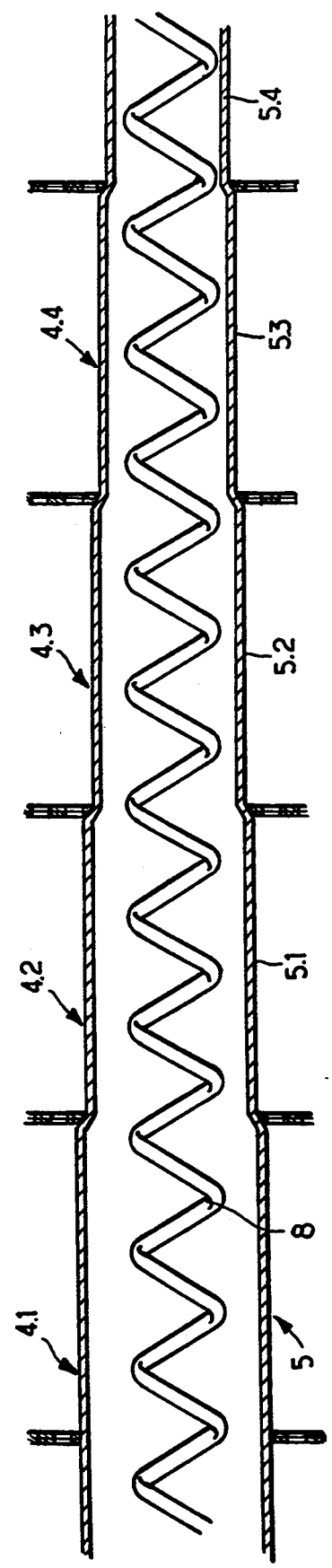

INSTALLATION FOR CONTINUOUSLY DRYING, DEHYDRATING OR MICROWAVE BAKING OF GRANULAR OR POWDERED PRODUCTS

The present invention relates to an installation for continuously drying, dehydrating or microwave baking of granular or powdered products.

French patent 2 606 577 describes a device enabling rapid heating with low thermal gradient of a liquid absorbing microwaves. Said device comprises an applicator coupled with the wave guide of a generator comprising an emitting tube, such as a magnetron and its supply.

In said patent, an advantageous embodiment provides for the applicator to have a parallelipiped internal cavity of which each of the three dimensions is between 20 and 30 cm for a guided radiation frequency equal to 2450 MHz and that the applicator cooperates with two coupling slots or two coupling antennas spaced apart at approximately 17 cm. An embodiment of this type enables a microwave field to be obtained in hybrid mode inside said internal cavity of the applicator in which the product to be heated is located. Thus, heating of the product throughout this space is remarkably homogeneous and the increase from one temperature level to another takes place very quickly.

The disadvantage of said known device is that treatment of the product is intermittent and requires operations to insert said conditioned product in the applicator and extract it after heating. This results in considerable timewasting and relatively high cost. It cannot in point of fact be applied to bulk products.

European patent application no. 0 141 657 discloses an embodiment in which the product treatment is continuous. Said known embodiment consists in using an Archimedes screw passing through an applicator coupled with a microwave generator. The Archimedes screw is solid and fills the conveyor sheath in section.

The disadvantage of such an embodiment is that the energy efficiency is low and is not therefore profitable.

The aim of the present invention is to heat continuously, preferably but non restrictively, with this known applicator, powdered or granular products, such as cereals, flour, metal oxide powders, etc., so as to subject them to special treatment: drying, dehydrating, cooking or other.

To achieve this aim and in compliance with the invention, the installation comprises, in conjunction with at least one applicator connected to a generator by means of a coupling device, a dielectric duct which passes through said applicator and contains a rotating metal screw for transporting the product to be treated, said metal screw comprising at least one helically wound wire extending at a distance from the axis of the duct and close to the internal surface thereof.

Thus, the product to be treated which is microwave-permeable, flows continuously through the applicator and is heated under the effect of microwaves. What it surprising is that the screw, which for reasons of resistance to mechanical stresses under temperature, is metal, does not interfere with the heating operation by microwaves and does not uncouple the applicator from the wave guide.

According to one particular embodiment, the generator of the or each applicator is controlled in such a way as to excite in said applicator a TM type hybrid whose electric field has a component parallel to the axis of the duct.

The coupling device is a single window connecting the or each applicator to the respective wave guide of the generator.

Each applicator has an parallelipiped shape internal volume whose length on each side is 20 to 30 cm for a radiation frequency equal to 2450 MHz, the dimensions of the window being adjusted to minimize the reflection coefficient towards the generator and in particular so as to be equal to 65×46 mm.

The internal diameter of the dielectric duct is 40 to 150 mm, arranging clearance of 2.5 to 15 mm with the screw whose thread, when it is round, has a diameter of 5 to 15 mm.

Advantageously, several applicators centered on the duct are arranged side by side and separated by perforated partitions, trapping the microwaves in their cavities without possible transfer from one to the other, but letting hot air pass through them which prevents condensation and which is circulated by means of a ventilation and heating device, said applicators being coupled with generators, either on one side or the other.

The hot air circulates from downstream upstreamwards with regard to the flow direction of the product to be treated in the duct.

The duct and the screw can cooperate, downstream of the or each coupling device, with a passage section reducing device which can comprise a dielectric rod extending coaxially in the duct and comprising an internal cooling circuit.

Further, various other features and advantages of the invention are apparent from the detailed description which follows:

Embodiments of the subject of the invention are shown, by way of non-limiting examples, in the attached drawings.

BRIEF DESCRIPTION OF THE DRAWINGS

FIG. 7 is a view similar to FIG. 6 on a smaller scale; and

FIG. 8 is a view similar to FIG. 7 illustrating an alternative embodiment of the duct.

Figure 1:
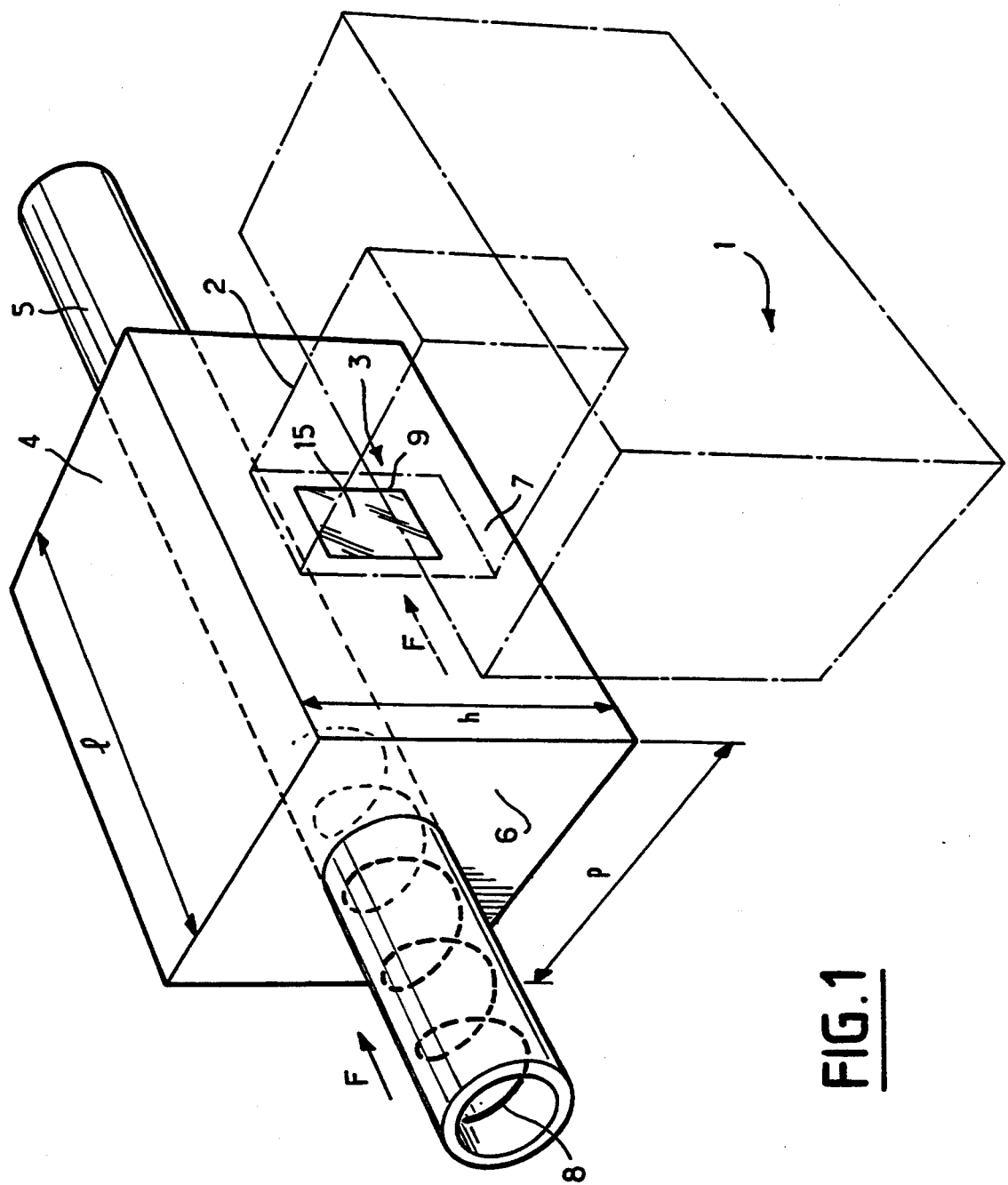
FIG. 1 is a schematic, perspective view illustrating an installation employing the present invention.

Thus, as shown in FIG. 1, the basic structure comprises a ultrahigh frequency wave generator 1 comprising an emitting duct and its supply. The duct, such as a magnetron, is mounted in a wave guide 2 connected via a coupling device 3 to an applicator 4.

The basic structure also comprises a duct 5 passing through the lateral walls 6 of the applicator 4, parallel to its previous coupling wall 7. The applicator 4 is completely closed and its lateral walls 6 are advantageously fast with the duct 5. The latter contains a rotating screw conveyor 8, comprising a helically wound wire, as is the case for certain springs.

In the example shown, the applicator 4 is the one disclosed in French patent 2 606 577 with reference to FIG. 1. It is a parallelipiped and its sides measure at most four times the half-length of the guided wave of the emitted radiation. Since the frequency of microwaves is usually between 2 and 3 GHz, the dimensions of the applicator are 20 to 30 mm.

More accurately, for a frequency of 2450 MHz, the upright section h×p of the of the applicator 4 is equal to 22×20 cm and the length is equal to 30 cm.

Further, in the same example, the coupling device 3, instead of comprising two slots or antenna spaced apart from one another, is formed by a single window 9. Said window is adjusted to minimize the reflection coefficent-towards the generator. Thus, for the aforesaid frequency of 2450 MHz and the chosen dimensions of the applicator 4, the window measures 65×46 mm.

The generator 1 is controlled in such a way as to excite in said applicator 4 a TM (transverse magnetic) type hybrid mode of microwaves whose electric field has a component E parallel to the common axis of the duct 1 and the screw 8. In these conditions, the energy efficiency is optimized.

Of course, the duct 5 is in a dielectric substance which does not present with microwave losses. It can be in plastics material such as polypropylene, polyethylene, polytetrafluorethylene, etc. or thermal shock-resistant glass, porcelain, ceramic, etc.

However, the screw 8 is made of steel to resist the various mechanical stresses resulting from being driven at relatively high temperature. Experiments have shown that the operation of the applicator is not disturbed by the presence of the metal body and that the coupling between wave guide 2 and applicator 4 remains intact in excellent conditions. This experimental fact is surprising and such that it justifies the invention.

Although the dimensional characteristics of the applicator 4 are decisive witch regard to the guided radiation frequency for obtaining a homogeneous treatment temperature, those of the conveyor 5, 8 are, however, much less so.

Thus, the internal Diameter Di (FIG. 6) of the duct 5 is advantageously equal to or less than the guided half-wavelength; in the chosen example, it is equal to 65 mm. Nevertheless, experiments have shown that the internal diameter Di of the duct can be 40 to 150 mm.

However, the external diameter De of the screw 8 relative to the internal diameter Di of the duct 5 and the shape of the screw are critical, with the sole aim of said metal-type screw being compatible with the presence of microwaves in the applicator 4.

Thus, the diameter De of the screw is smaller than the diameter Di of the duct so as to allow clearance "j" of 2.5 and 15 mm to subsist between screw and duct, which clearance although in keeping with said diameters is chosen in accordance with the parameters covering the nature and state of the product, its creep speed, heating, and those concerning the microwave device.

In the aforementioned example, the diameter "d" (FIG. 6) of the metal wire comprising the screw 8 is equal to 10 mm for an external winding diameter "De" of 60 mm. However, the diameter can be 5 to 15 mm and its choice is likewise determined as mentioned above for the clearance "j". Said wire usually has a circular section, but other sections can be envisaged for driving the product.

Rotation of the screw entails slow and even movement of the product, but the part thereof which is located between the internal surface of the duct 5 and said metal screw comprises a screen such that the microwaves undergo negligible reflection.

FIGS. 2 to 5 show that several basis structures similar to that illustrated by FIG. 1, can be mounted in series on a common duct 5, said structures being designated by the general references 4 and 2 followed by the number in their line. The applicators 4.1, 4.2, . . . 4.5, however many there are in number, are arranged side by side and separated from one another by lateral walls 6.p which, instead of being solid, are perforated.

For various reasons and more particularly to prevent the product from sticking to the wall of the duct 5 (e.g., moist flour), it can be advantageous to heat up said wall. For this purpose, taken in direction F of the forward movement of the product, hot air is blown against the current (direction of the arrow G opposite to that of the arrow F) in the tunnel defined by said row of applicators 4.1 to 4.5 (FIGS. 2 and 5) or 4.1 to 4.3 (FIG. 3) between an inlet tube 10 of the applicator 4.5 or 4.3 and an outlet tube 11 of the applicator 4.1.

Figure 2:
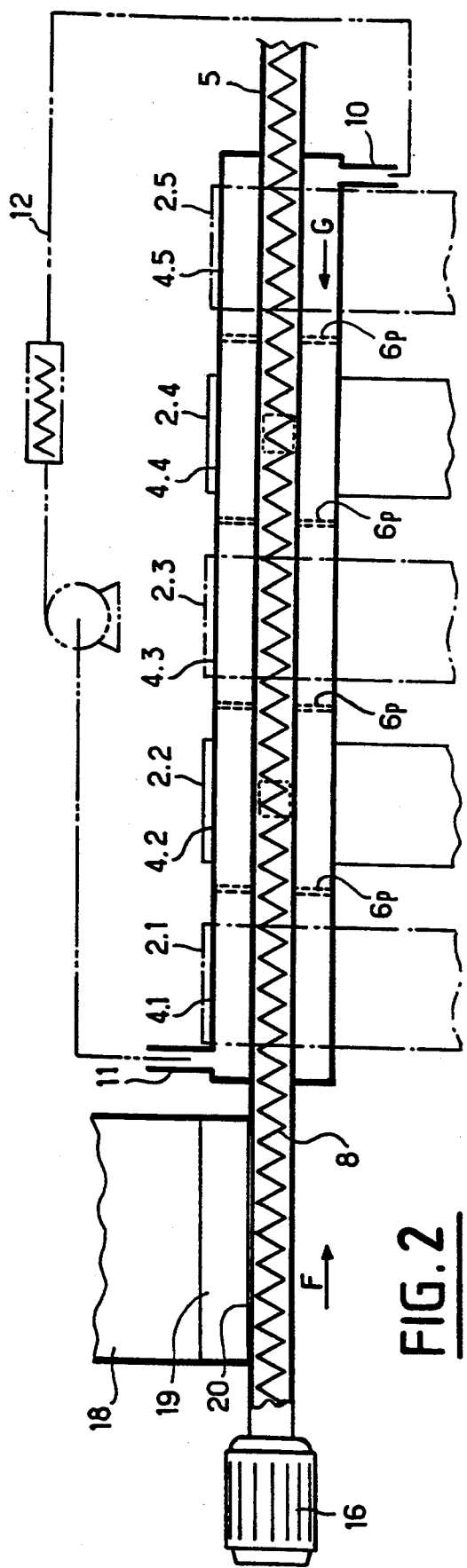
FIG. 2 is a side-sectional, elevational view illustrating a first embodiment of the present invention.
Figure 3:
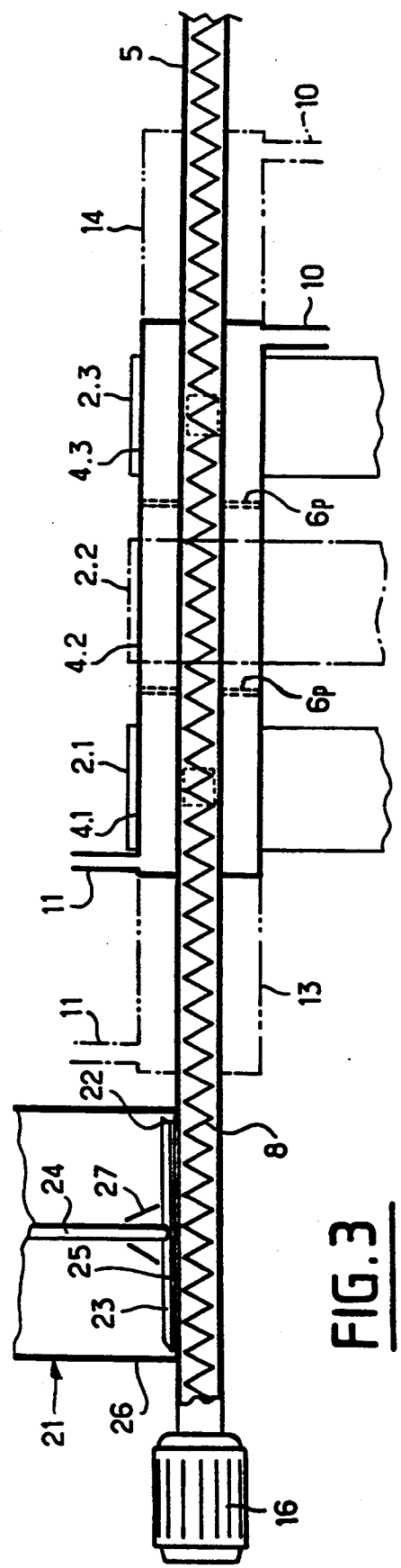
FIG. 3 is a view similar to FIG. 2 illustrating a second embodiment of the present invention.
Figure 4:
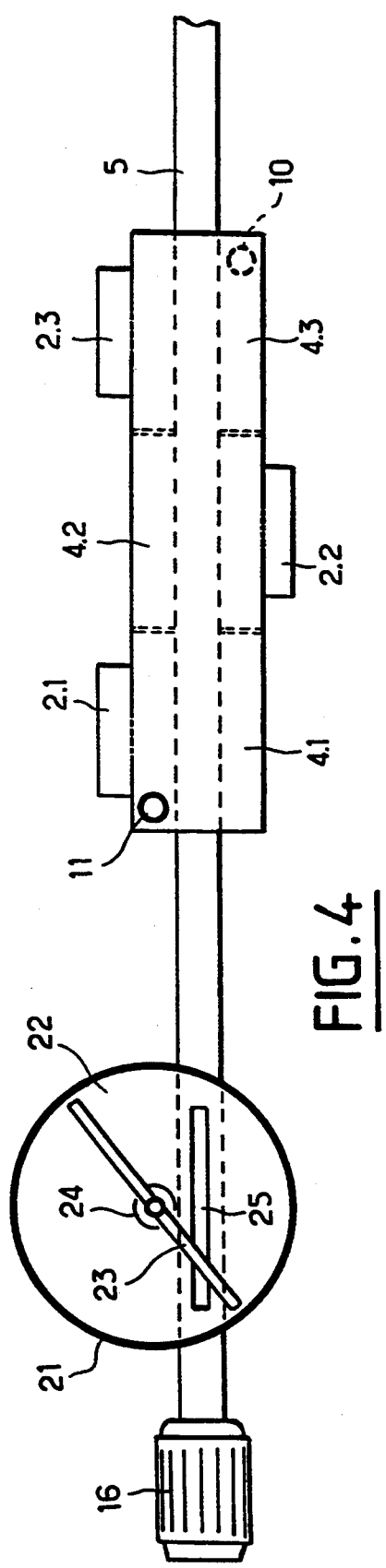
FIG. 4 is a top plan view of the structure illustrated in FIG. 3.
Figure 5:
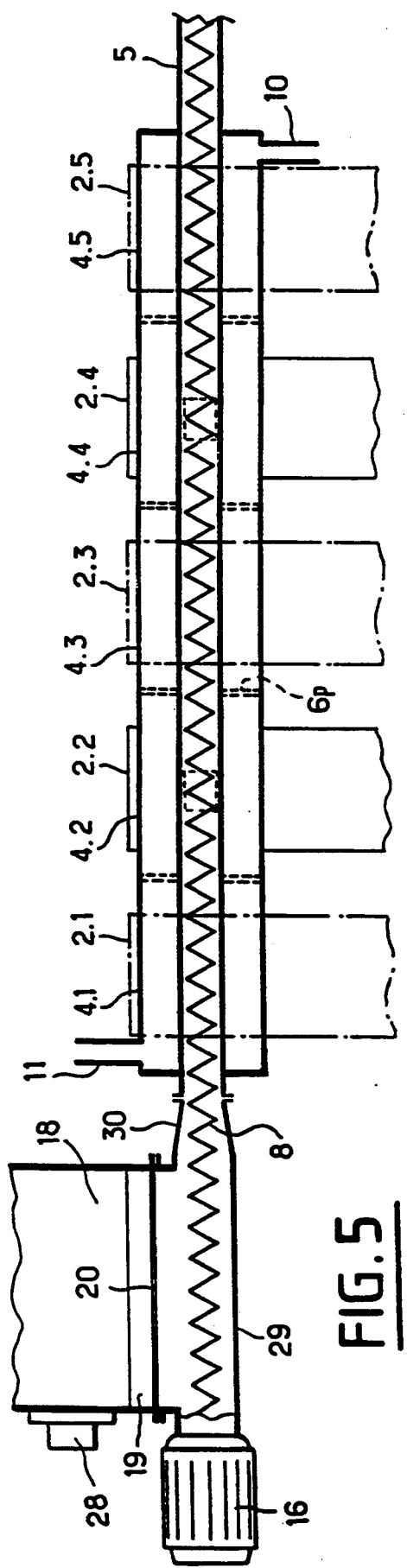
FIG. 5 is a view similar to FIG. 2 illustrating a third embodiment of the present invention.

The perforated lateral walls 6p of the applicators let hot air pass through to prevent condensation on the wall of the duct 5, but the perforations are such that the microwaves remain trapped in the internal cavities of said applicators. The tubes 10 and 11 are connected to a ventilation and heating curcuit 12. It should be noted that said series mounting of the applicators 4 is performed by coupling, either on the right or left-hand side, so as to be able to house the generators easily. Thus, the even row wave guides 2.2 and 2.4 reperesented by full lines in FIGS. 2 and 5 are located behind the applicators, whereas the odd row wave guides 2.1, 2.3 and 2.5 represented by dot-and-dash lines in the same Figures are located in front. In FIGS. 3 and 4, the arrangement is reversed.

It can be advantageous to heat the duct 5 beyond the row of applicators. To this end, and as shown in FIG. 3, the upstream applicator 4.1 can be extended by a conduit 13 having the same section provided with the outlet tube 11 and/or the downstream applicator 4.3 can be extended by a conduit 14 provided with the inlet tube 10.

Of course, it is desirable to protect the generator 1 from heating and to this end, an protective cover 15 (FIG. 1) in polytetrafluorethylene is mounted in the coupling window 9. It thus insulates against heat transmission, but does not interfere with ultrahigh frequency coupling.

It is explained above that the screw 8 is rotary. It is coupled at its upstream end with a variable speed drive unit 16 FIGS. 2 to 5) which enables the protube flow rate to be adjusted.

Further, during its heat treatment, the protube undergoes a change in volume, more accurately reduction. It is therefore desirable that downstream of each applicator 4, the passage section of the duct 5 is appropriate, which enables the appearance of gaps in the "spiral" of product on the move and to homogenize the heating even more so.

For this purpose, the conveyor 5, 8 can cooperate with a passage section reducing device.

Figure 6:
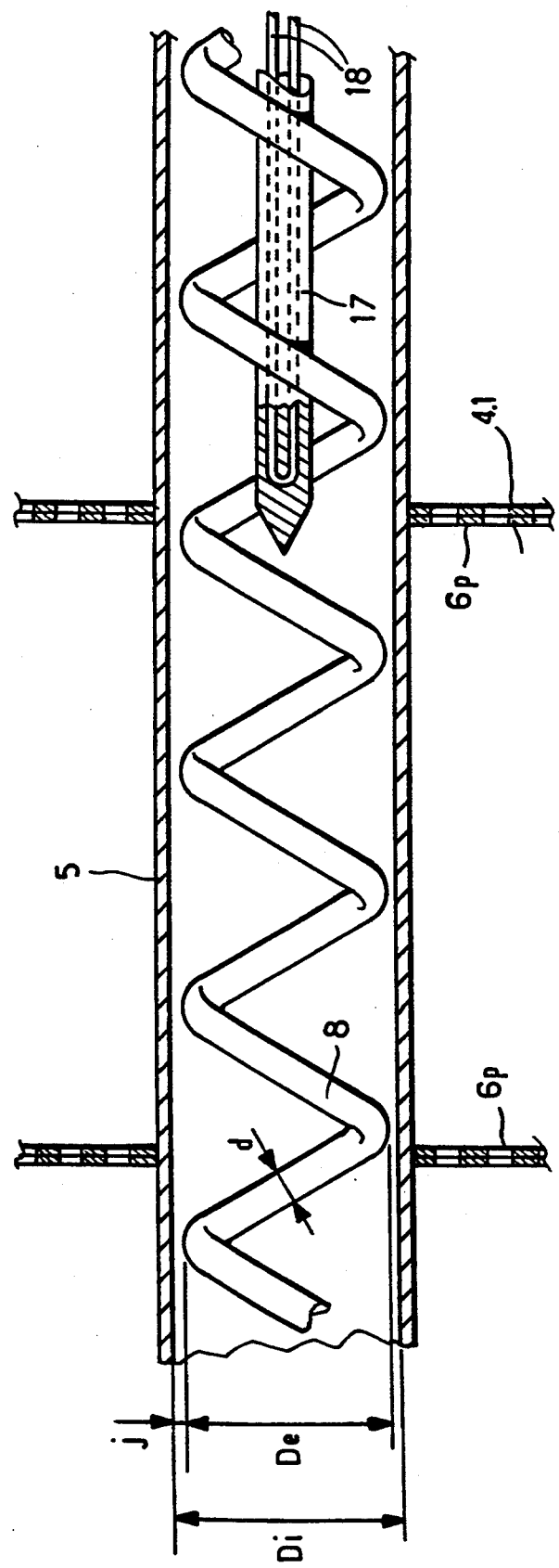
FIG. 6 is an enlarged partial sectional view illustrating a duct in accordance with the present invention.

FIG. 6 shows such a device which is comprised of a dielectric substance rod 17 extending coaxially in the duct 5 upstreamwards from the first applicator 4.1. The section of said rod corresponds to aforesaid passage section reduction of said duct.

Said rod is advantageously cooled since, if its core temperature were that of the treated product, it would risk being deformed. Therefore, a cooling circuit 18 is incorporated in the rod. For example, said circuit can comprise a curved duct on which said bar is moulded and in which the water coolant circulates.

When the installation comprises several applicators mounted in series, the section of the rod 17 increases, as shown in Figure 7, each time the product temperature rises, i.e., when each applicator is passed over. Thus, the rod 17 according to FIG. 7 has stepped sections 17.1, 17.2, 17.3, etc. of increasing diameters.

According to a variant illustrated in FIG. 8, the passage section reducing device is comprised of the duct 5 which in turn has successive sections 5.1, 5.2, 5.3 with decreasing internal diameters.

Further, the duct 5, instead of being stepped, can be conical and cooperate with a screw 8 likewise conical.

Of course, it is possible to combine between them a stepped or conical duct and a rod likewise stepped.

Said installation requires that the duct 5 be suitably supercharged with product, so as to prevent gaps which would affect the homogeneity of the heating. For upstream supercharging, several embodiments can be implemented.

According to the first embodiment illustrated in FIG. 2 and operating by gravity, the feed device comprises a vat 18 whose converging lower sides 19 discharge opposite a slot 20 which the duct 5 has between the upstream applicator 4.1 and the speed drive unit 16. The vat 18 can be replaced by a simple cylindrical nozzle connected perpendicularly or aslant on said duct.

Said feed device according to FIG. 2 is suitable when the product flows perfectly by gravity and fills all gaps appropriately.

If the product flow is more difficult, the second embodiment shown in FIGS. 3 and 4 can be implemented. It comprises a trough 21, close to the bottom 22 of which a scraper blade 23 coupled with a drive shaft 24 rotates. The bottom 22 delimits an eccentric slot 25 located opposite a drain 26 of the duct 5, a slot which receives the product swept by the blade 23. A cone 27 can be provided in the trough to prevent the formation of bridges in the stored product and promote continuous and full filling of the duct 5.

If the flow is even more difficult, the third embodiment illustrated in FIG. 5 can be implemented. It resembles the first, but the vat 18 is provided with at least one vibrating apparatus 28 and feeds the slot of a conduit 29 connected via a supercharging diffuser 30 to the duct 5. The screw 8 extends in the conduit to force the product to penetrate the duct after precompression in the diffuser. The part of the screw located in the conduit 29 can be identical to the one rotating in the duct; it can however be advantageous to increase its diameter and impart a conical shape to its envelope in place of the diffuser.

Experiments have shown that in said microwave installation, no sticking occurs on the wall of the duct 5, in contrast with what would happen in hot air if the product were flour.

The temperature measured at the outlet of the duct by thermocouple is homogeneous and can be adjusted to the required value by acting on the product flow rate (the speed of the variable speed drive unit 16) and/or the microwave power of the generators. Further, the increase from one temperature level to another is performed very quickly, in a few minutes.

We claim:

1. An installation for continuously treating a granular or powdered product, comprising at least one microwave applicator connected to a generator by means of a coupling device, and a dielectric-duct having an axis and an internal surface, said dielectric duct passing through said at least one applicator and containing a rotating metal screw for conveying the granular or powdered product, said rotating metal screw including at least one helically wound wire extending longitudinally at a radial distance from said axis of said duct and proximate said internal surface thereof, so that an annular clearance is defined between said wire and said internal surface of said duct.

2. The installation according to claim 1 wherein said at least one applicator operates in a hybrid mode.

3. The installation according to claim 2, wherein said generator of said at least one applicator includes means for exciting microwaves in said at least one applicator in a TM type hybrid mode, the latter having an electric field which has a component parallel to said axis of the dielectric duct.

4. The installation according to claim 1, wherein said generator has a wave guide and wherein said at least one applicator has a single window which connects said at least one applicator to said wave guide of said generator to form said coupling device.

5. The installation according to claim 4, wherein said at least one applicator has a parallelpiped shaped internal volume having sides, each of said sides having a length which is in the range of 20 to 30 cms for a radiation frequency substantially equal to 2450 MHz, and wherein said window of said at least one applicator has dimensions which are adjusted to minimize a reflection coefficient toward said generator.

6. The installation according to claim 5, wherein said dimensions of said window are substantially equal to 65×46 mms.

7. The installation according to claim 4, wherein said window of said at least one applicator is sealed by a dielectric and thermally insulating cover.

8. The installation according to claim 4, wherein the dielectric duct has an internal diameter in the range of 40 to 150 mms, and wherein said clearance arranged between the helically wound wire and the internal surface of said duct is in the range of 2.5 to 15 mms.

9. The installation according to claim 8, wherein the wire is round and has a diameter in the range of 5 to 15 mms.

10. The installation according to claim 8, wherein the internal diameter of the electric duct is substantially equal to 65 mms, and wherein the metal screw has an external diameter which is substantially equal to 60 mms.

11. The installation according to claim 10, wherein the wire is round in cross-section and has a diameter substantially equal to 10 mms.

12. The installation according to claim 1, comprising several applicators centered on the dielectric duct, arranged axially aligned, and separated by partitions having perforations, each one of said applicators having an internal volume and said perforations being such that the microwaves remain trapped in the internal volumes of the applicators without transfer from one to the other, and such that said perforations let hot air pass therethrough, said hot air preventing condensation and being circulated by means of a ventilation and heating device, and wherein said applicators are coupled with generators on either side.

13. The installation according to claim 12, wherein said applicators are disposed in rows having ends, and wherein at least one of said rows is extended, at at least one of its ends, by a conduit also conveying hot air along the duct.

14. The installation according to claim 12, wherein, the product to be treated in the duct flows in one direction, and hot air circulates from an opposite direction.

15. The installation according to claim 1, it further comprising a device for feeding the duct with product to be treated, said device being able to operate via gravity or force.

16. The installation according to claim 1, wherein the product to be treated in the duct flows in one direction, and wherein the duct and the screw cooperate with a passage section reducing means disposed, in said flow direction, downstream of the coupling device.

17. The installation according to claim 16, wherein the passage section reducing means comprises a dielectric rod disposed in the duct and extending coaxially therewith.

18. The installation according to claim 17, wherein the dielectric rod comprises an internal cooling circuit.

19. The installation according to claim 16, wherein the passage section reducing means comprises at least one reduced diameter portion of the duct.

* * * * *